(12) United States Patent
Britting

(10) Patent No.: US 12,320,762 B2
(45) Date of Patent: Jun. 3, 2025

(54) CALIBRATION SAMPLE SET AND METHOD FOR LI-ION BATTERY GAUGING SYSTEMS

(71) Applicant: THERMO FISHER SCIENTIFIC MESSTECHNIK GMBH, Erlangen (DE)

(72) Inventor: Alexander Britting, Lauf a. d. Pegnitz (DE)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 274 days.

(21) Appl. No.: 18/062,643

(22) Filed: Dec. 7, 2022

(65) Prior Publication Data

US 2023/0184698 A1    Jun. 15, 2023

Related U.S. Application Data

(60) Provisional application No. 63/266,476, filed on Jan. 6, 2022, provisional application No. 63/265,300, filed on Dec. 13, 2021.

(51) Int. Cl.
*G01N 23/06* (2018.01)
*H01M 10/42* (2006.01)

(52) U.S. Cl.
CPC ........ *G01N 23/06* (2013.01); *H01M 10/4285* (2013.01); *G01N 2223/04* (2013.01); *G01N 2223/642* (2013.01)

(58) Field of Classification Search
None
See application file for complete search history.

(56) References Cited

U.S. PATENT DOCUMENTS

| | | |
|---|---|---|
| 2003/0024106 A1 | 2/2003 | Kawaguchi et al. |
| 2020/0408584 A1 | 12/2020 | Nebel et al. |
| 2021/0172888 A1* | 6/2021 | Hofman ............... G01N 23/083 |

FOREIGN PATENT DOCUMENTS

JP    2014199245 A    10/2014

OTHER PUBLICATIONS

Chueinta W., et al., "Beta Gauge for Aerosol Mass Measurement," Aerosol Science and Technology, 2001, vol. 35, pp. 840-843.
(Continued)

*Primary Examiner* — Hoon K Song
(74) *Attorney, Agent, or Firm* — William R McCarthy, III

(57) ABSTRACT

A method for preparing surrogate calibration standards for web gauging, is provided. The method includes providing linearizations for one or more radiometric gauges, each linearization associated with a radiometric gauge and relating the basis weight of real standards, comprising a lithium ion battery (LIB) electrode material, to transmission of the radiation through the LIB electrode material. The method also includes providing one or more surrogate standards comprising an inert material having an effective Z ($Z_{surrogate}$) substantially the same as an effective Z ($Z_{real}$) of the LIB material in the real standards. The method further includes assigning to each surrogate standard a surrogate basis weight based on a transmission of radiation through the surrogate standard and the linearizations.

19 Claims, 6 Drawing Sheets

(56) References Cited

OTHER PUBLICATIONS

NIST: "X-Ray Mass Attenuation Coefficients—Introduction," Retrieved on Oct. 28, 2021, 1 page, Retrieved from the Internet URL: https://physics.nist.gov/PhysRefData/XrayMassCoef/intro.html.
NIST: "X-Ray Mass Attenuation Coefficients—Section 2," Retrieved on Oct. 27, 2021, 3 pages, Retrieved from the Internet URL: https://physics.nist.gov/PhysRefData/XrayMassCoef/chap2.html.
PCT/EP2022/084854, International Search Report and Written Opinion, Mar. 17, 2023, 13 pages.

* cited by examiner

CALIBRATION SAMPLE SET AND METHOD FOR LI-ION BATTERY GAUGING SYSTEMS

CROSS REFERENCE TO RELATED APPLICATIONS

This application claims priority to U.S. application No. 63/265,300 filed Dec. 13, 2021, and U.S. application No. 63/266,476 filed Jan. 6, 2022, which disclosures are herein incorporated by reference in their entirety.

FIELD OF THE INVENTION

This invention is directed to calibration standards for radiometric gauges. In particular, surrogate calibration standards are described that can be used to calibrate radiometric gauges used for gauging lithium ion battery electrode materials.

BACKGROUND OF THE INVENTION

Lithium ion batteries (LIB)s have become the secondary batteries of choice for the new generation of electric and hybrid vehicles. Stricter emission standards, along with falling battery prices, has driven tremendous growth in this market as well as in energy storage, consumer electronics, medical equipment, and power tools. In the production of LIBs, using a continuous-web process, an initial step of wet or dry coating on an aluminum (cathode) or copper (anode) substrate is a challenging operation, yet uniform coating is critical to avoid defects and failures of the battery. Accurate coating measurement and control on both sides of the substrate ensures raw material savings, improving yield and quality. Subsequent process steps include drying, for wet coating processes, and a final calendering step. Calendering improves electrical contact, adhesiveness and assures the desired characteristics. Coating thickness and calender control are critical to ensure final dimensional accuracy.

Radiometric gauges have been implemented for measurement of LIB continuous-web processes. Radiometric gauges are based on the absorption, transmission or scattering of ionizing radiation such as x-rays, beta-rays, or gamma-rays. A schematic of a typical radiometric transmission gauge 100 for measuring a web 101 is illustrated by FIG. 1. The radiometric transmission gauge 100 includes a source 104 positioned to direct a radiation beam 106 at a sample area 108. The web or sample (e.g., a calibration standard) 101 is positioned so that it can move in a direction 99 through, or be place in, sample area 108 where the radiation beam 106 passes from top surface 102 of the web or sample 101, through the web or sample 101 which absorbs/scatters a portion of the radiation 106. In some configurations, the radiation beam 106 is rastered across the width of the web, in a direction perpendicular to the web travel direction 99. In some other configurations the beam spans the width of the web without rastering. The transmitted radiation 110 then passes out of a bottom surface 103 of the web or sample 101, where the transmitted radiation 110 is detected by a detector 112, positioned opposite to the radiation beam 106. Different detectors 112, such as ionization chambers, solid state detectors or scintillating materials coupled to photo sensors, e.g. photodiodes (PDs), photomultipliers (PMTs), or silicon photomultipliers (SiPMs) can be used to provide a signal related to the transmitted radiation 110. Several data acquisition techniques 114, depending on the sensor technology, are used to convert the signal into an electrical signal, such as I/U conversion including ADC sampling, charge integration or photon counting.

To relate the signal from the detector 112 to a property of the web 101, a linearization 116 is implemented. Linearization 116 refers to the conversion of the detected signal I, which is normalized for the beam intensity $I_o$, into measurement values such as a basis weight for a web 101. The linearization can be a formula, such as a linear or polynomial equation, that is stored in a memory 118 of a computer 120 and that can be executed by a CPU 122 of the computer 120 as part of an algorithm. A visual representation of a linearization is a calibration curve 124 relating $I/I_o$ to the basis weight (BW), which can be displayed, for example by a monitor 126 controlled by the CPU 122. Compensation algorithms, executable by the CPU 122, are also typically necessary to remove internal and external effects. For example, compensating algorithms can correct for drift, variation of air temperature and pressure in the sample area 108, or variation in chemical composition of the web 110. In addition to algorithms to process the signals from data acquisition 114, the computer 120 can control the gauge 100 and associated components/systems, such as irradiation power of the source 104, movement of the material 101 through the sampling area 108, and emergency shutoff protocols. The computer 120 can be directly wired or wirelessly connect to components of the system including the radiometric gauge 100, can be included in a cluster of computers, and can be included in a control centre.

The necessary adaption at LIB electrode manufacturers to their individual products requires a lot of time and material waste, both of which increase the operating costs. A standard procedure is to either take online or offline samples, measure and weigh them, strip the coating, and measure and weigh them again (weigh-strip-weigh process—WSW). However, the samples, which are coated anode or cathode materials, are very brittle and have coating variations. During this handling process, samples often brake. For cathode materials which contain heavy metals, such as NMC (LiNiMn-$CoO_2$), toxicity is an additional concern, both for operators and for waste management. Therefore, LIB electrode manufactures are forced to prepare a lot of samples and spend a lot of time in calibrating each radiometric gauge to achieve the required process control. Where manufacturing facilities typically include different gauges and different lines, the WSW process needs to be repeated for each gauge. Furthermore, any long-term stability checks using the same samples is not possible due to the previously described fragility of the samples.

Accordingly, there is an urgent need for robust, easy to handle, economical, and traceable factory calibration standards. These calibration standards should ideally also be transferable across different radiometric gauges and applicable for measurement of both anode substrates, anode active materials, cathode substrates, and cathode active materials.

SUMMARY

Systems, methods, and products to address the above identified and other needs are described herein with respect to the following illustrative, non-limiting, implementations. Various alternatives, modifications and equivalents are possible.

In accordance with a first aspect, a method for preparing surrogate calibration standards for web gauging, is provided. The method includes providing linearizations for one or more radiometric gauges. Each linearization is associated with a radiometric gauge and relates the basis weight of real standards, which include a lithium ion battery (LIB) electrode material, to transmission of the radiation through the LIB electrode material. The method also includes providing one or more surrogate standards including an inert material having an effective Z ($Z_{surrogate}$) substantially the same as an effective Z ($Z_{real}$) of the LIB material in the real standards. The method further includes assigning to each surrogate standard a surrogate basis weight based on a transmission of radiation, provided by the radiometric gauge, through the surrogate standard and the linearizations.

In accordance with a second aspect, a calibration sample set for radiometric gauges is provided. The calibration sample set includes one or more surrogate standards made according to the first aspect. Optionally one or more features of the inert material is that the material is not degraded by ionizing radiation provided by the gauges, does not absorb water, does not react or degrade in air, and is non-toxic. Optionally, the surrogate standards are configured as a foil or sheet having a uniform thickness and a uniform density throughout.

In accordance with a third aspect, a method of calibrating a radiometric gauge is provided. The method includes providing one or more surrogate standards made according to the method of the first aspect and positioning the surrogate standards one at a time in a sampling area of the radiometric gauge. The method also includes measuring transmission of radiation through the surrogate standards using the radiometric gauges, thereby providing a transmission measurement for each surrogate standard measured; and constructing linearization of basis weight to transmission measurement by relating the surrogate basis weight to the transmission measurements.

The surrogate standards made by the methods described herein are robust, easy to handle, economical, and traceable factory calibration standards.

BRIEF DESCRIPTION OF THE DRAWINGS

The foregoing and other features and advantages of the present embodiments will be more fully understood from the following detailed description of illustrative embodiments taken in conjunction with the accompanying drawings.

Figure 1:
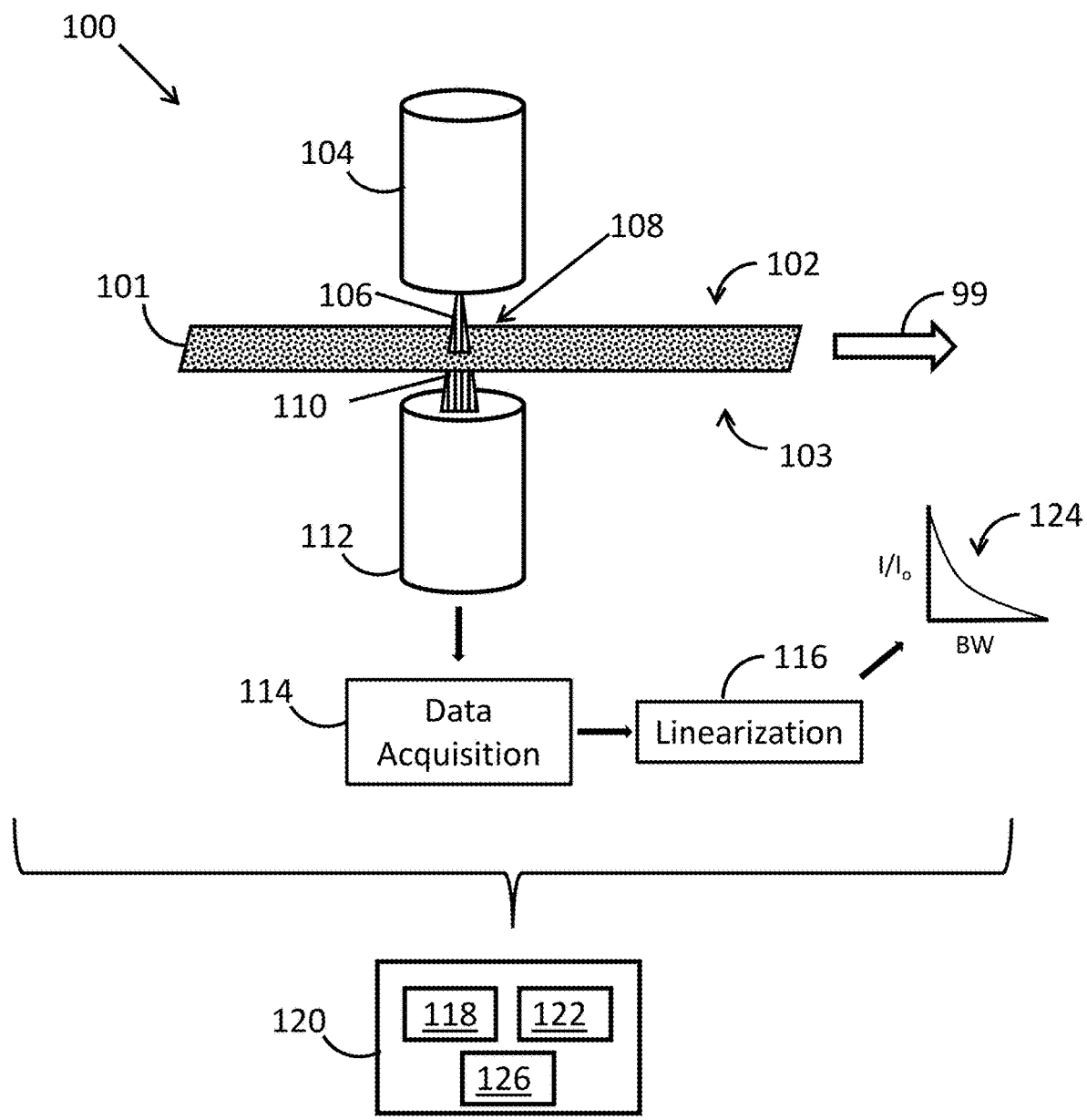
FIG. 1 is a diagrammatic view of a radiometric gauge system.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments. Surrogate calibration standards as disclosed herein would have configurations and components determined, in part, by the intended application and environment in which they are used.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. The term "about" as used herein is meant to mean close to, or approximately, a particular value, within the constraints of sensible, commercial engineering objectives, costs, manufacturing tolerances, and capabilities in the field of radiometric gauging. The term "substantially" as used herein is meant to mean mostly, or almost the same as, within the constraints of sensible, commercial engineering objectives, costs, manufacturing tolerances, and capabilities in the field of radiometric gauging.

Accordingly, unless indicated to the contrary, the numerical parameters set forth in the specification and attached claims are to be understood as being modified by the term "about" and may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Figure 2:
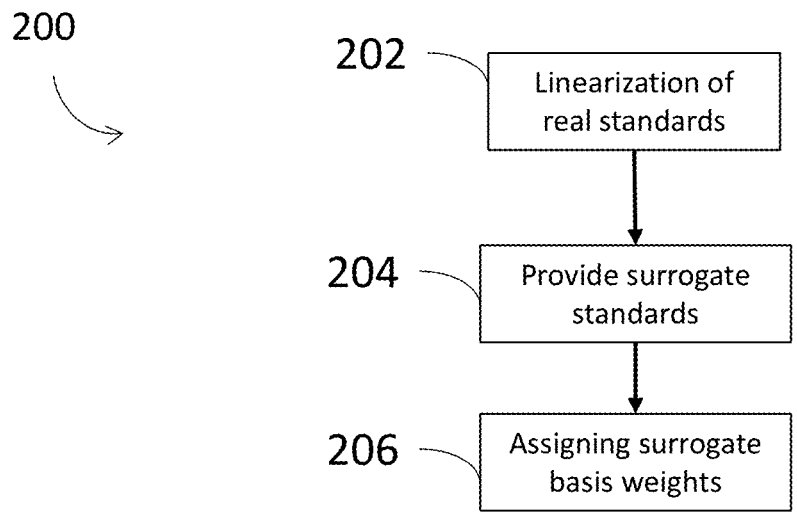
FIG. 2 is a flow diagram illustrating a method for preparing surrogate calibration standards for web gauging, according to some implementations.

FIG. 2 is a flow diagram illustrating a method for preparing surrogate calibration standards for web gauging 200, according to some implementations. A linearization of real standards is obtained or provided in step 202. The real standards include LIB electrode materials. Each linearization of a real standard in step 202 is associated with a radiometric gauge that will be used for measuring surrogate standards. The linearization relates the basis weight of the real standards to transmission of radiation through a LIB electrode material of the real standard. In a second step 204, surrogate standards are provided. The surrogate standards include an inert material having effective Z, $Z_{surrogate}$, substantially the same as an effective Z, $Z_{real}$, of the LIB material in the real standards. In a third step 206, a surrogate basis weight is then assigned to each of the surrogate standards. The surrogate basis weight is assigned based on transmission of radiation, provided by the radiometric gauge, through the surrogate standards and the linearization curve of the real standards.

In some implementations, one or more radiometric gauges are used, such as a radiometric gauge that provides beta-rays (e.g., a beta-gauge such as having a Kr-85 or a Sr-90 source), gamma-rays (e.g., a gamma-gauge) or x-rays (e.g., an x-ray gauge). In some implementations, beta-gauges are used. In some implementations x-ray gauges are used. In some implementations, beta-gauges and x-ray gauges are used. In some implementations, more than one gauge of the same kind, such as a beta gauge having a Kr-85 and a beta-gauge having a Sr-90 source. In some implementations, the radiometric gauges have different energies, such as an x-ray gauge having a Mo x-ray source and an x-ray gauge having a Rh x-ray source. The radiometric gauges can also include filters, collimators, and the like to modulate the energy provided from the radiometric gauges. In some implementations, one or more radiometric gauges provide a different energy of ionizing radiation from the remaining radiometric gauges. As will be elaborated below, the radiometric gauges, should be matched and configured similarly. That is, the gauges used for measurements of real standards and surrogate standards, or the same surrogate standards and same real standards at different times, should be matched and configured similarly so that the irradiations provided are about the same. This allows for direct comparison of the values for validations and calibrations.

As used herein "inert" refers to the robustness and stability of the surrogate standards, such that the surrogate standards remain substantially unchanged during handling and during extended use in the ionizing environment of the sample area 108 of radiometric gauges 100 (FIG. 1). In some implementations, the inert material used in the surrogate standards is not degraded by the ionizing radiation used by the radiometric gauges. That is, the material has a high radiation hardness. For example, the inert material does not change chemically or physically so that the normalized transmission of the ionizing radiation (I/Io) changes by less than 0.1% (e.g., less than about 1%, less than about 10%) per month (720 hours) of continuous irradiation of the surrogate standards. In some implementations, the inert material does not absorb water. For example, the material does not absorb more than about 0.01 wt. % (e.g., less than about 0.1 wt. %, less than about 1 wt. %) of its dry mass of water. In some implementations, the inert material does not react or degrade in air, such that the inert material does not change chemically or physically in a way that the normalized transmission of the ionizing radiation (I/Io) changes by less than 0.1% (e.g., less than about 1%, less than about 10%) per month (720 hours) of exposure of the surrogate standards to ambient air. In some implementations, the surrogate standards can be stored in dry and/or inert gas (e.g., $N_2$, Ar, He) to mitigate any sensitive to water and/or air. In some implementations, the inert material is non-toxic. That is, the surrogate samples do not shed or deposit a toxic amount of material while being handled by human or mechanical operators for measurement by the radiometric gauges. For example, less than the Lowest Lethal Dose ($LD_{Lo}$) of material is shed or deposited, where the $LD_{Lo}$ is the lowest amount of a solid or liquid material reported to have caused the death of animals or humans upon exposure to the material. In some implementations, where the material is or has some level of toxicity, the sample is handled using appropriate personal protective equipment and procedures. The surrogate standard also should have sufficient mechanical strength to be repeatedly handled by human or mechanical operators as required by the web gauging process. Where the surrogate standard includes a thin foil that may be susceptible to tearing or bending, in some implementations the thin foil can be supported by a structure such as a frame.

In addition to being inert, the surrogated standard materials are selected to be machinable or formable into a useful shape for measurement. For example, the surrogate standard can include a thin structure such as a sheet, foil web, or plate. In such a form, the surrogate standard can be place in a sample area 108 (FIG. 1) for radiation transmission measurement therethrough. In some implementations, the surrogate standards include a foil or sheet. In some implementations, the surrogate standards are also uniform in thickness and density throughout, so that radiation 106 from the top surface 102 to the bottom surface 103 encounters the same mass and kind of material at any point of entry for the radiation 106. That is, the absorption profile for radiation 106 is uniform through the surrogate standard at any point of surface area 102 and perpendicular to the surface 102.

In some implementations, the surrogate standards are foils or sheets, where at least a first surrogate standard and a second surrogate standard have different thicknesses. For example, the calibration set can be a set of 1-100 foils or sheets (e.g., 1-50, 1-15) made of the same material, and each having different thicknesses ranging in values between about 1 μm and 5000 μm (e.g., between about 1 μm and 1000 μm). In some implementations, the calibration set includes different materials or subsets of different materials, such as a subset for a cathode substrate surrogate standard, a subset for an anode calibration standard, a subset for a cathode coating (active) material surrogate standard, and a subset for an anode coating (active) material surrogate standard.

The material included in the surrogate standards is also selected to have a low material cost, and low cost for production into the desired form. That is, where two or more materials can be used with similar advantages with respect to other considerations (e.g., inert, machinable), a material having a lower cost, such as the aggregated cost for both for the material and production to the desired form, is selected.

The surrogate standards are selected to mimic as closely as possible the absorption characteristics of the ionizing radiation of the LIB battery and real standards. A useful method to select materials for the surrogate standards is to match the effective atomic number of the surrogate standard material, $Z_{surrogate}$, to that of the effective atomic number of the LIB materials, $Z_{real}$. The effective atomic number for mixtures is a weighted average of the components and depends on the radiation kind and energy. The calculation of the effective atomic number when beta-rays are used requires using the stopping power. Methods for this calculation are known to the person of skill in the art, for example as described in Michael F. L'Annunziata, in "Radioactivity Introduction and History, Chapter 2.5 on Stopping Power and Linear Energy Transfer, Pages 119-140, (2007). The calculation of the effective atomic number when X-rays are used can be calculated more directly and is shown for illustrative purposes below.

For x-rays the $Z_{real}$ can be estimated by equation A;

$$Z_{real(x)} = \sqrt[3]{\sum_{i=0}^{n} Z_i^3 w_i \Big/ \sum_{i=0}^{n} w_i} \ ; \qquad \text{Equation 2}$$

where n is the number of components (chemical elements), $Z_i$ are the atomic numbers of the components, and $w_i$ are the contributions from each of these components. For x-rays, the third order relation is not always correct, for example varying between about 2 and 5, depending on factors such as the pre-filtering, operation parameters, and chemical elements of the compound. A person of skill in the art can select other orders to better estimate $Z_{real}$ based on the specific factors considered and as described by R. C. Murty, "Effective Atomic Numbers of Heterogeneous Materials," *Nature* volume 207, pages 398-399 (1965).

Applying Equation 1 for the cathode electrode material NMC622, having the composition $LiNi_{0.6}Mn_{0.2}Co_{0.2}O_2$, the following $Z_{real(NMC622)}$ is calculated:

$$Z_{real(NMC622)} = \{[(3)^3(1) + [(28)^3(0.6) + (25)^3(0.2) + (27)^3(0.2) + (8)^3(2)]/(1+0.6+0.2+0.2+2)\}^{1/3} = 17.5.$$

A surrogate material with a $Z_{surrogate}$ that matches the $Z_{real}$ as close as possible is selected, while simultaneously fulfilling as closely as possible the other desirable criteria described above. In some implementations, the absolute difference between $Z_{surrogate}$ and $Z_{real}$ is less than or equal to 15, or $|Z_{surrogate} - Z_{real}| \leq 15$ (e.g., $\leq 10$, $\leq 5$). In some implementation, the difference between $Z_{surrogate}$ and $Z_{real}$ is less than or equal to 10. Similar calculations can be made for other cathode materials. The calculated values are shown in Table 1.

TABLE 1

Calculated $Z_{real}$ for cathode active materials.

| | $LiNi_{0.5}Mn_{1.5}O_4$ | $LiCoO_2$ | $LiMn_2O_4$ | NMC622 |
|---|---|---|---|---|
| $Z_{real}$ | 20.4 | 17.3 | 16.8 | 17.5 |

In terms of elemental materials, aluminum is a good choice as a surrogate for NMC622 when X-rays are used, since the calculated $Z_{real(NMC622)}$ of 17.5 is close the atomic number of Al (Al:$Z_{surrogate}$=13), so that $|Z_{surrogate} - Z_{real}|$ is 4.5. Aluminum is also machinable or formable into the desired thin structures, it is inert and, it can be made as a structure with a uniform density. It is understood that aluminum alloys can also be selected, which can have desirable structural/machinable properties and have similar $Z_{surrogate}$ values (modified by the alloying elements) are inert and have uniform densities. Another good option is titanium (Ti:$Z_{surrogate}$=22), where $|Z_{surrogate} - Z_{real}|$ for NMC622 is also 4.5. Titanium also fulfills the other desirable criteria such as inertness, uniformity, and machinability. A similar analysis shows that aluminum and titanium are reasonable surrogate material selections for the other cathode active materials (Table 1), where Ti is a better match for $LiNi_{0.5}Mn_{1.5}O_4$, although aluminum can also be used. In some implementations, a single surrogate material is used for both beta-ray gauges and x-ray gauges. In some other implementations, a different surrogate material is used for beta-gauges and x-ray gauges.

A much simpler determination for surrogate materials can be made with regards to the substrate. The typical substrate material for cathodes in LIBs is aluminum, and accordingly an aluminum surrogate material is a good choice for the surrogate standard. The typical choice of substrate material for anodes in LIBs is copper (e.g., electrodeposited copper) and accordingly a copper surrogate material is a good choice. Where the substate material is chosen as another elemental material or alloy, the same material can be chosen as the surrogate material for the surrogate standard.

The anode active materials used in LIBs are predominantly graphitic materials. Where graphite is too brittle and fragile for repeated handling, carbon containing polymeric resins provide a large class of materials that can be used as a surrogate. The person of skill can select among the many possibilities for radiation hardness, price, long term stability, and low humidity uptake. In some implementations, the material used for the surrogate standard is an organic polymer, such as polyethylene or polypropylene. In some implementations the surrogate standard material is biaxially oriented polypropylene (BOPP).

In some implementations, the surrogated standards include an indicia or label to show/indicate the assigned surrogate basis weight. The indicia are configured to not interfere with the ionizing radiation provided by the radiometric gauge when the surrogate standard is positioned in the sampling area 108 of the radiometric gauge 100 (FIG. 1) for measurement. In some implementations, the surrogate standard includes a frame configured to hold the surrogate standard. In some implementations, the indicia are positioned on the frame. The indicia can be anything that identifies the BW for the surrogate standard, such as a reference numeral associated with a look-up table having the BW values, a RFID, a bar-code, or the actual BW value. Since and RFID chip could be damaged by direct or stray radiation, in implementations using an RFID chip the chip can be encase in a protective covering or shell/box, such as a thick plastic cover (e.g., 1 mm to 10 cm of Polycarbonate or another organic polymer).

Figure 3:
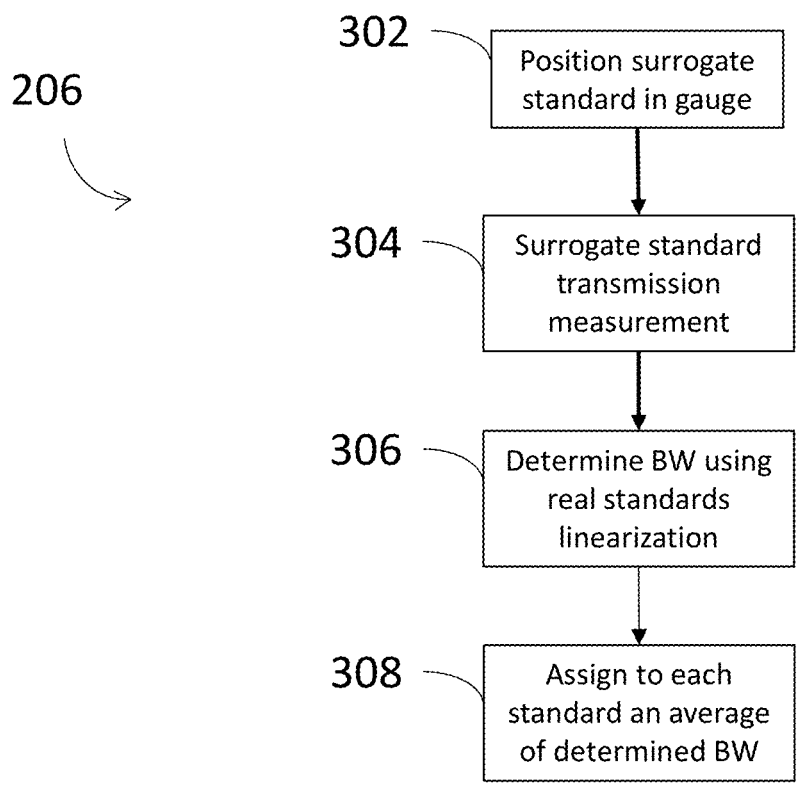
FIG. 3 is a flow diagram illustrating detailed steps for assigning to each surrogate standard a surrogate basis weight, according to some implementations.

FIG. 3 is a flow diagram illustrating detailed steps for assigning to each surrogate standard a surrogate basis weight 206, according to some implementations. Step 302 is to position the surrogate standards in the sampling area 108 of the radiometric gauges 100 (FIG. 1). Each surrogate standard used is positioned one at a time for each radiometric gauge used. The transmission of radiation through the surrogate standards is measured in step 304. This provides a surrogate standard transmission measurement (SS-transmission measurement or SS-TM). One SS-TM is provided for each radiometric gauge and each surrogate standard. Each SS-TM can be an average of several measurements through different areas of the surrogate standards. Steps 302 and 304 are iterated until all the gauges used, and all of the standards are measured. For example, if there are 3 surrogate standards ($S_1'$, $S_2'$, $S_3'$) and 3 gauges ($G_1'$, $G_2'$, $G_3'$) there will be 9 transmission measurements. Subsequent to collection of the SS-TM, Step 306 is to determine basis weights for each of the surrogate standards by selecting the basis weights for corresponding transmission measurements from the linearization for each of the radiometric gauges. This provides one basis weight for each surrogate standard and each radiometric gauge. For the example of 3 surrogate standards and 3 gauges, this would give 9 basis weight values. Step 308 is to assign to each surrogate standard an average of the determined basis weights for each surrogate standard measured at each radiometric gauge. For the example of the 3 surrogate standards and 3 gauges, this would provide 3 BW values—each value an average of the BW determined for each surrogate standard using each of the 3 gauges.

Figure 4:
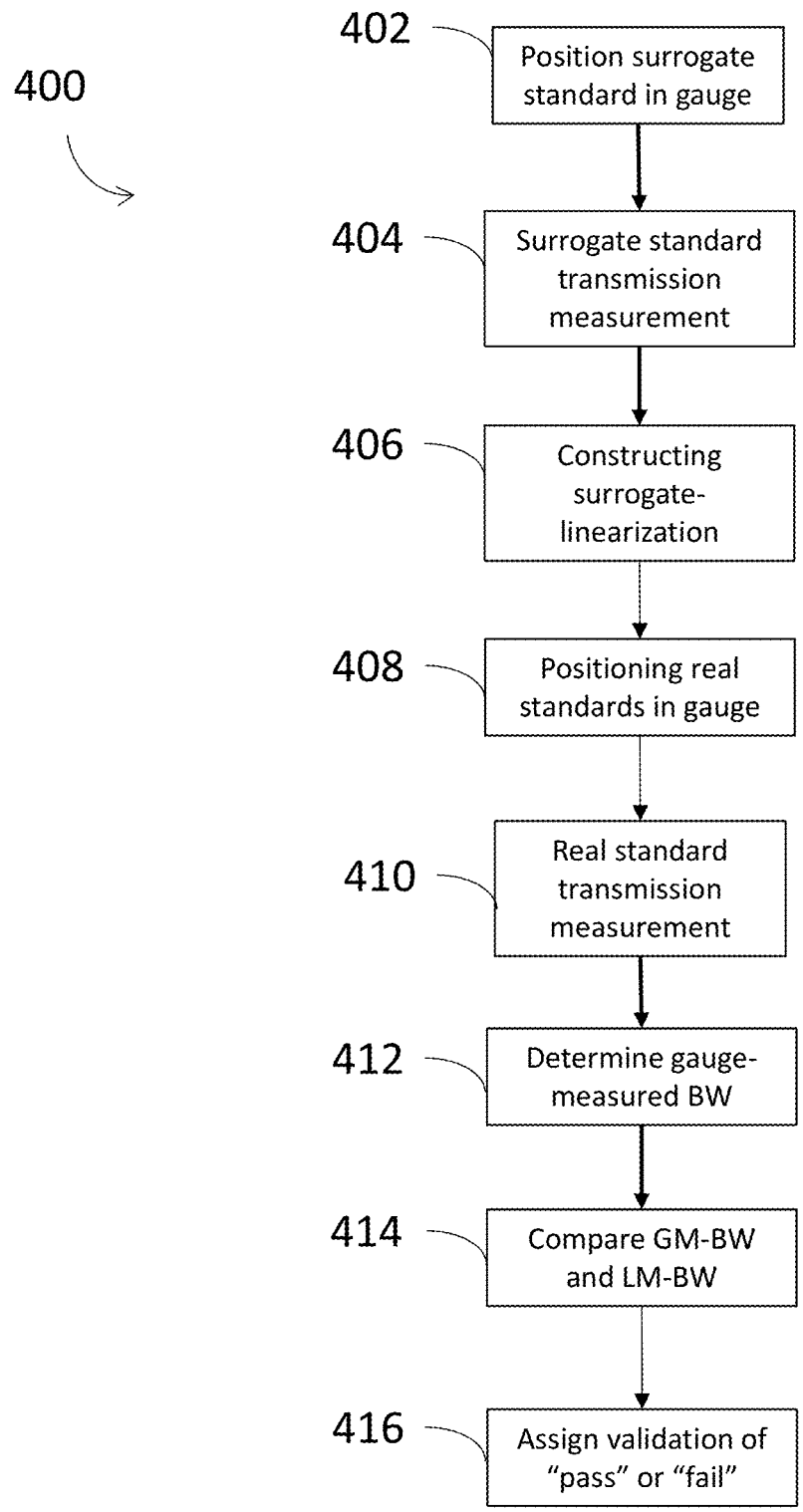
FIG. 4 is a flow diagram showing steps for providing a validation of the basis weight value assigned to surrogate standards, according to some implementations.

FIG. 4 is a flow diagram showing additional steps 400 that provide a validation of the BW value assigned by step 206 (FIGS. 2 and 3), according to some implementations. The first three steps, 402, 404, and 406 provide a surrogate linearization. Step 402 is to position the surrogate standards in the sampling area 108 of the one or more radiometric gauges 100 (FIG. 1). Each surrogate standard used is positioned one at a time for each of the radiometric gauges used. The transmission of radiation through the surrogate standards is measured using the radiometric gauges in step 404. This provides a surrogate standard transmission measurement ($SS^2$-transmission measurement or $SS^2$-TM) for each surrogate standard measured at each radiometric gauge. Steps 402 and 404 are iterated until all the gauges are used, and all of the standards are measured, so that the number of SS$^2$-TM is the number of surrogate standards times the number of gauges. Each SS$^2$-TM can be an average of several measurements through different areas of the surrogate standards. Steps 402 and 404 are similar to steps 302 and 304 except that 402, 404 can be additional steps. The radiometric gauges used for steps 302, 304 are the same gauges used for steps 402, 404 and the gauges are configured to be the same (e.g., same irradiation power, same spot size, same targeted area on the surrogate samples, same distance from the irradiating head and detector, etc . . . ). The purpose is to achieve the same irradiating conditions, although due to moment to moment variations and uncontrollable errors or noise, there are always some slight variations that may or may not be detectable. Step 406 is constructing the surrogate-linearizations of basis weight to transmission measurement by relating the surrogate basis weight, step 206 (FIGS. 2 and 3), to the SS$^2$-TM. One surrogate-linearization is constructed for each of the radiometric gauges.

The subsequent 3 steps, 408, 410, and 412, involve measuring real standards. Step 408 is to position the real standards in the sampling area 108 of the radiometric gauge 100 (FIG. 1), wherein the real standards are positioned one at time for each real standard and each radiometric gauge. The radiometric gauges used are the same as were used in step 402. The radiometric gauges are also configured the same way as in step 402. For example, the radiometric gauge might be used in a factory for a purpose requiring a different configuration not related to the steps 400, or the radiometric gauge may have drifted from the optimal settings after the step 402. In these cases, the radiometric gauges are re-set or re-configured to the settings used in step 402. Step 410 is to measure transmission of radiation through the real standards using the radiometric gauges. This provides transmission measurements, RS-transmission measurement or RS-TM. One RS-TM is provided for each real standard measured and at each radiometric gauge. Each RS-TM can be an average of several measurements through different areas of the surrogate standards. In some implementations, the number of measurements and pattern of measurements through the sample area 108 of each radiometric gauge 100 are the same as done in step 404. Step 412 is to determine gauge-measured BW (GM-BW) for each of the real standards by selecting the basis weights for corresponding transmission measurements from the surrogate-linearization for each of the radiometric gauges. This provides one GM-BW for each surrogate standard and each radiometric gauge.

The remaining two steps, 414 and 416 are to confirm that the surrogate samples provide a sample set that can be used to make a surrogate-linearization which provides BW values of real samples, such as for LIB web monitoring, with an acceptable accuracy. Step 414 is to compare the gauge-measured BW (GM-BW) for each of the real standards to the lab-measured basis weights (LM-BW). The LM-BW can be obtained by measuring the dimensions (area) and the mass, using a laboratory balance, of the real standards. The LM-BW are considered the "gold standard" or "real" basis weight measurements. The comparison is a numerical comparison of the of LM-BM and GM-BM. Step 416 is to assign all of the surrogate standards a validation value of (i) pass if a numerical comparison between the GM-BW and LM-BW fulfills a pre-defined accuracy criterion, or (ii) fail if the numerical comparison does not fulfill the pre-defined accuracy criteria. In some implementations, the pre-defined accuracy criteria is an absolute difference in the numerical comparison between the GM-BW and LM-BW (e.g., |(GM-BW)−(LM-BW)| in g/m$^2$, where the absolute difference is less than about 0.1 (e.g., ≤0.2, ≤0.5). In some implementations, the numerical comparison a comparison of the absolute percent difference between the GM-BW and LM-BW values.

According to some implementations, the surrogate standards can be used for calibrating a radiometric gauge. This consists of implementing steps 402, 404 and 406 on a radiometric gauge 100 (FIG. 1). For example, the surrogate standards can be validated and then transported to a 1$^{st}$ manufacturing setting having a beta or x-ray gauge which is calibrated using the surrogate standards. The beta-gauge and x-ray gauge can process some material and then, after a time, the beta-gauge and x-ray gauge can be calibrated again. The surrogate standards can also be transported to a 2$^{nd}$, 3$^{rd}$, 4$^{th}$ etc. manufacturing setting and the radiometric gauges in the different settings can be calibrated using the surrogate standards.

Figure 5:
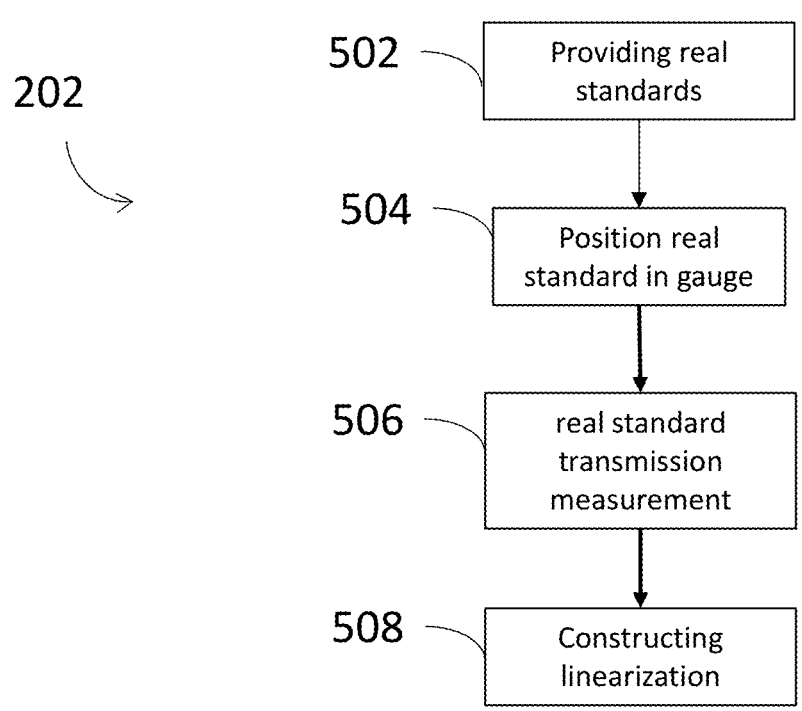
FIG. 5 is a flow diagram showing steps for providing the linearization of real standards, according to some implementations.

FIG. 5 is a flow diagram showing steps for providing the linearization of real standards 202, according to some implementations. Step 502 is to provide one or more of the real standards comprising a LIB electrode material, the real standards each having a LM-BW. Step 504 is to position the real standards in the sampling area 108 of one or more of the radiometric gauges 100. The real standards are positioned one at time for each real standard and each radiometric gauge. Step 506 is to measure the transmission of radiation through the real standards using the radiometric gauges. This provides a transmission measurement (RS$^2$-transmission measurement or RS$^2$-TM), one for each real standard measured and at each radiometric gauge. Step 508 is to construct linearizations of basis weight to transmission measurement by relating the LM-BW to the RS$^2$-TM. One linearization is constructed for each of the radiometric gauges. In some implementations, the radiometric gauges used, and configurations used for the radiometric gauges, are similar or the same as those used for one or more measurements done at steps 410 (FIG. 4), 404 (FIG. 4), and 304 (FIG. 3). Matching the gauges and configurations provides comparable transmission measurements that can be used to assign surrogate basis weights to the surrogate standards that relate back to real standards and real LIB materials.

In some implementations, the real standards are provided by cutting the real standards out of a web of the LIB electrode material to a defined or measured area, weighing the real standards to provide the mass, and calculating the LM-BW from the weight and area to provide the LM-BW value. In some implementations, the web of LIB electrode comprises a cathode substrate, an anode substrate, a cathode active material, and an anode active material or a combination of one or more layers of these. In some implementations, the LIB material comprises two or more layers and, after measuring transmission of radiation through the real standards using the radiometric gauges, and prior to weighing the real standards to provide the mass, all but one of the layers is removed from the real standards, wherein the remaining layer is weighted to provide the mass (e.g., WSW technique).

The steps shown by FIG. 5 are one possible method for providing the linearization of real standards 202. Any other method can be used where a trusted linearization can be provided. The purpose is to provide trusted linearizations that can be used for assigning surrogate basis weight values to the surrogate standards.

EXEMPLIFICATION

I. Introduction

Standard methods for gauging are known and can be used, for example as described in IEC 61336:1996 *Nuclear instrumentation Thickness measurement systems utilizing ionizing radiation Definitions and test methods*, published Nov. 28, 1996. This document defines performance data of radiometric gauges, which includes linearity and calibration accuracy. It also defines the individual parts of a radiometric gauge, such as source, detector, etc. However, to address improvements for calibration of LIB web-production processes, such as improvements to WSW techniques, the following desirable criteria were identified for surrogate calibration standards:

(a) long-term stability to ensure the same readings over 10+ years;
(b) non-hygroscopic to prevent errors by ambient humidity variations;
(c) insensitivity to ionizing radiation;
(d) thickness homogeneity to ensure the same reading for spot size variations and measurement location;
(e) have similar transmission/adsorption to the radiation of the radiometric gauges;
(f) economical;
(g) easy to manufacture; and
(h) non-hazardous.

With respect to measuring the samples, these should be measured in the same pass-line. That is the same radiometric gauge—or same kind of radiometric gauge are used, where the radiometric gauges are configured to irradiate the real standards and surrogate standards similarly. This allows for direct comparison between real standards and the surrogate standards.

With respect to the anode and cathode reference sample sets (for primary references-real calibration standards) the following are desirable criteria:

(a) sample covering the whole production range;
(b) same chemical composition of substrate and coating for all samples;
(c) total weight of samples is known or measurable; and
(d) coated samples require same substrate material (chemical composition and thickness) as uncoated samples to remove substrate influence.

II. Materials for Surrogate Sample Sets

Table 2 summarizes the material and thicknesses for a surrogate sample set. The materials were chosen to match the original material as close as possible by matching the effective Z numbers. In addition, the samples are usable for x-ray and beta-ray measurements, which requires—esp. for x-ray—and average atomic number, which is similar to the original material. These samples should not be considered as limiting since other materials with similar characteristics could be used.

TABLE 2

Surrogate standards sample set.

| | Surrogate cathode substrate | | Surrogate cathode coating | | Surrogate anode substrate | | Surrogate anode coating |
|---|---|---|---|---|---|---|---|
| sample # | Al >99.0% Thickness | sample # | Ti >99.0% Thickness | sample # | ED-Cu >99.0% Thickness | sample # | BOPP foil Thickness |
| S1  | 3 μm   | S12 | 5 μm   | S27 | 3 μm  | S35 | 15 μm   |
| S2  | 6 μm   | S13 | 10 μm  | S28 | 5 μm  | S36 | 30 μm   |
| S3  | 9 μm   | S14 | 15 μm  | S29 | 8 μm  | S37 | 50 μm   |
| S4  | 12 μm  | S15 | 20 μm  | S30 | 11 μm | S38 | 65 μm   |
| S5  | 15 μm  | S16 | 30 μm  | S31 | 16 μm | S39 | 80 μm   |
| S6  | 10 μm  | S17 | 40 μm  | S32 | 24 μm | S40 | 100 μm  |
| S7  | 20 μm  | S18 | 50 μm  | S33 | 32 μm | S41 | 150 μm  |
| S8  | 30 μm  | S19 | 60 μm  | S34 | 50 μm | S42 | 200 μm  |
| S9  | 40 μm  | S20 | 70 μm  |     |       | S43 | 270 μm  |
| S10 | 50 μm  | S21 | 80 μm  |     |       | S44 | 320 μm  |
| S11 | 100 μm | S22 | 100 μm |     |       | S45 | 370 μm  |
|     |        | S23 | 120 μm |     |       | S46 | 420 μm  |
|     |        | S24 | 150 μm |     |       | S47 | 500 μm  |
|     |        | S25 | 200 μm |     |       | S48 | 750 μm  |
|     |        | S26 | 250 μm |     |       | S49 | 1000 μm |

Figure 6:
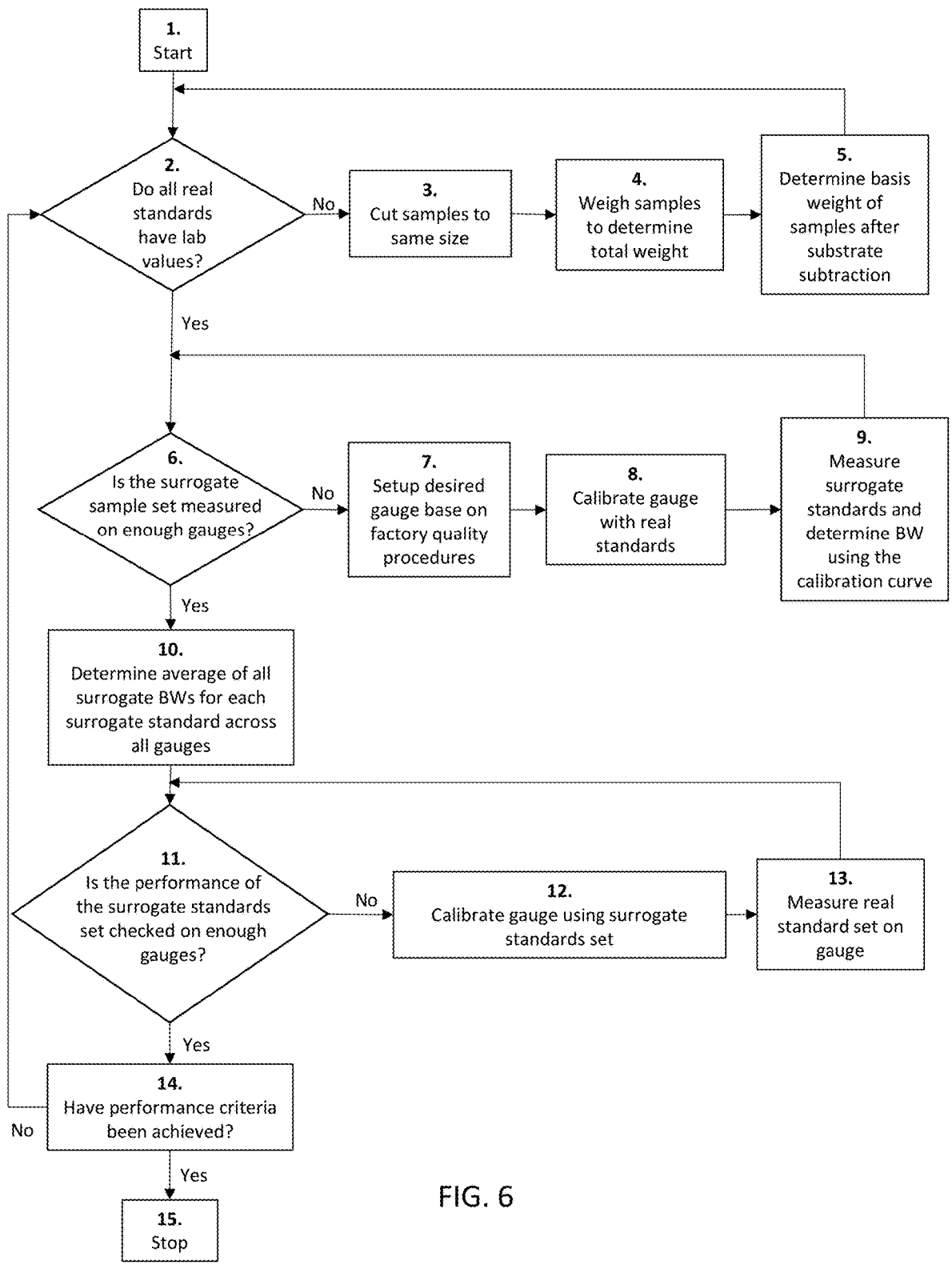
FIG. 6 illustrates the procedure used for sample set referencing, according to some implementations.

The flow diagram shown by FIG. 6 illustrates the procedure that was used for sample set referencing. Referencing refers to assigning a basis weight for each of the surrogate standards based on real standard calibrations. The steps 1 to 15 are as follows.

ing the referencing procedure, the surrogate standards were validated using 4 gauges heads for anode and cathode. The error was derived from balance errors determining the basis weight of the referenced anode and cathode samples and the statistical variation across the 4 gauges.

TABLE 3

Test using plastic samples.

| Sample Number | Carbon hydrogene basis weight [g/m$^2$] measured in lab Carbon hydrogen | Radiometric equivalent copper basis weight [g/m$^2$] Anode substrate | Radiometric equivalent Graphite basis weight [g/m$^2$] Anode coating | Radiometric equivalent Aluminum basis weight [g/m$^2$] Cathode substrate | Radiometric equivalent NMC622 basis weight [g/m$^2$] Cathode coating |
|---|---|---|---|---|---|
| 1(PET) | 9.71 | 5.24 ± 0.15 | 11.77 ± 0.16 | 7.86 ± 0.14 | 7.59 ± 0.15 |
| 2(PET) | 16.56 | 8.87 ± 0.16 | 19.73 ± 0.16 | 13.27 ± 0.16 | 12.78 ± 0.16 |
| 3(PET) | 26.23 | 14.21 ± 0.18 | 31.07 ± 0.17 | 21.18 ± 0.17 | 20.29 ± 0.18 |
| 4(PET) | 32.55 | 17.69 ± 0.19 | 38.30 ± 0.17 | 26.32 ± 0.17 | 25.13 ± 0.19 |
| 5(PET) | 51 | 28.19 ± 0.25 | 59.27 ± 0.17 | 41.67 ±0.21 | 39.43 ± 0.26 |
| 6(PET) | 70.3 | 39.70 ± 0.29 | 81.03 ± 0.20 | 58.22 ± 0.25 | 54.63 ± 0.27 |
| 7(PET) | 92.9 | 53.64 ± 0.38 | 105.9 ± 0.25 | 77.90 ± 0.28 | 72.50 ± 0.33 |
| 8 (PET) | 174.5 | 109.2 ± 0.52 | 194.1 ± 0.75 | 151.64 ± 0.35 | 139.1 ± 0.51 |
| 9(PC) | 242.8 | 161.0 ± 0.6 | 267.2 ± 1.0 | 213.07 ± 1.5 | 197.0 ± 0.57 |
| 10(PC) | 345.7 | 244.0 ± 0.8 | 379.5 ± 1.0 | — | 287.6 ± 0.77 |
| 11(PC) | 483.1 | 349.8 ± 1.3 | — | — | 414.3 ± 1.4 |
| 12(PC) | 591 | — | — | — | 515.1 ± 1.3 |
| 13(PC) | 646 | — | — | — | 569.0 ± 2.1 |
| 14(PC) | 816.4 | — | — | — | 728.1 ± 7.4 |

1. Start referencing.
2. Do all real standards have lab values? If no, complete steps 3-5, if yes proceed to 6.
3. Cut samples from a LIB web to same size to provide real standards.
4. Weigh the real standards to determine total weight of each sample.
5. Determine basis weight of the real standards after substrate subtraction. (WSW).
6. Is the surrogate standard set measured on enough radiometric gauges? If no complete steps 7-9, if yes proceed to 10.
7. Setup desired radiometric gauge based on factory quality procedures.
8. Calibrate radiometric gauge with real standards (measure real standards and produce calibration curve).
9. Measure surrogate standards and determine for each a surrogate BW determined by the calibration of step 8.
10. Determine average of all surrogate BWs for each surrogate standard across all gauges.
11. Is the performance of the surrogate standards set checked on enough measurement heads? If no complete steps 12 and 13. If yes proceed to step 14.
12. Calibrate radiometric gauges using surrogate standard set (measure surrogate standards and produce a calibration curve—this should look the same as the reference calibration curve for each gauge).
13. Measure real standards one the radiometric gauges to determine accuracy.
14. Have performance criteria been achieved? If no go to step 2. If yes go to 15.
15. Stop referencing.

III. Performance Check for Surrogate Sample Sets, Using In-House Plastic Sample Set.

Figure 7:
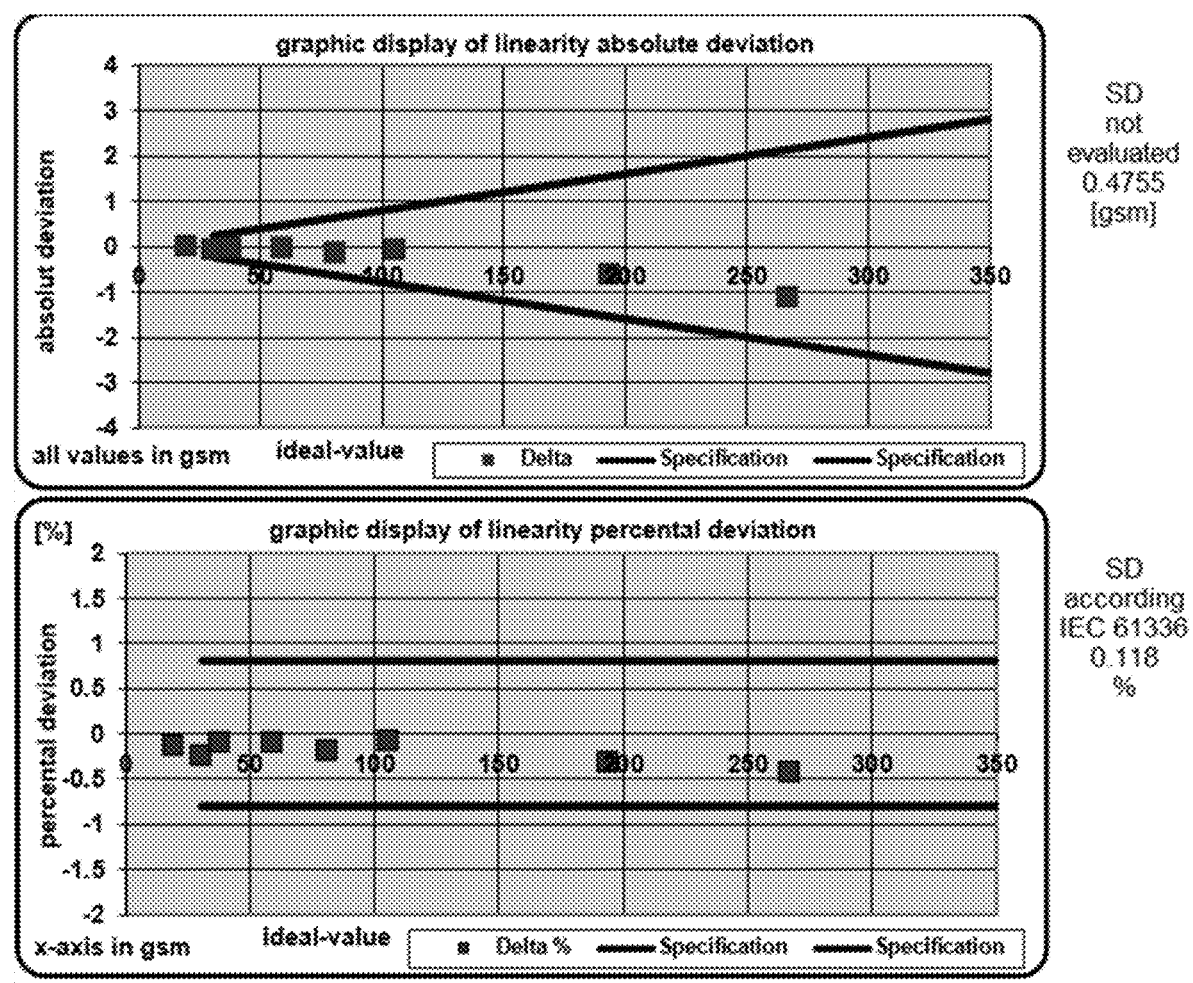
FIG. 7 is a plot depicting the accuracy of surrogate calibration standards, according to some implementations. The top panel shows the absolute deviation, the bottom panel shows the percent deviation.

An in-house sample set consists of different polyethylene terephthalate (PET) and polycarbonate (PC) samples. These are conveniently obtained in flat uniform sheets. By apply- IV. Calibration Accuracy A radiometric gauge calibrated to graphite using the original calibration standard set was used to re-check the in-house surrogate sample set values. Table 4 shows the listed values. FIG. 7 is a plot depicting the accuracy: the top panel shows the absolute deviation, the bottom panel shows the percent deviation.

TABLE 4

Accuracy measurement values.

| Identification | | Readings | deviation | |
|---|---|---|---|---|
| Sample # | Ideal-value (g/m$^2$]) | Reading (g/m$^2$) | delta (g/m$^2$]) | delta (%) |
| 1F | 11.77 | 11.72 | −0.05 | −0.4248% |
| 2F | 19.73 | 19.70 | −0.03 | −0.1521% |
| 3F | 31.07 | 30.99 | −0.08 | −0.2575% |
| 4F | 38.3 | 38.26 | −0.04 | −0.1044% |
| 5F | 59.27 | 59.20 | −0.07 | −0.1181% |
| 6F | 81.03 | 80.87 | −0.16 | −0.1975% |
| 7F | 105.9 | 105.80 | −0.10 | −0.0944% |
| 8F | 194.1 | 193.46 | −0.64 | −0.3297% |
| 9F | 267.2 | 266.04 | −1.16 | −0.4341% |
| 10F | 379.5 | 379.22 | −0.28 | −0.0738% |

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A method for preparing surrogate calibration standards for web gauging, the method comprising:
   providing linearizations for one or more radiometric gauges, each linearization associated with a radiometric gauge and relating the basis weight of real standards, comprising a lithium ion battery (LIB) electrode material, to transmission of the radiation through the LIB electrode material;
   providing one or more surrogate standards comprising an inert material having an effective Z ($Z_{surrogate}$) substantially the same as an effective Z ($Z_{real}$) of the LIB material in the real standards;
   positioning the surrogate standards in a sampling area of the radiometric gauges, wherein the surrogate standards are positioned one at time for each surrogate standard and each radiometric gauge;
   measuring transmission of radiation through the surrogate standards using the radiometric gauges, thereby providing a SS-transmission measurement for each surrogate standard measured and at each radiometric gauge;
   determining basis weights for each of the surrogate standards by selecting the basis weights for corresponding transmission measurements from the linearization for each of the radiometric gauges, thereby providing one basis weight for each surrogate standard and each radiometric gauge; and
   assigning to each surrogate standard an average of the determined basis weights for each surrogate standard measured at each radiometric gauge.

2. The method according to claim 1 further comprising:
   constructing surrogate-linearizations of basis weight to transmission measurement by relating the surrogate basis weight to the $SS^2$-transmission measurements, wherein one surrogate-linearization is constructed for each of the radiometric gauges;
   positioning the real standards in the sampling area of the radiometric gauges, wherein the real standards are positioned one at time for each real standard and each radiation gauge;
   measuring transmission of radiation through the real standards and using the radiometric gauges, thereby providing a RS-transmission measurement for each real standard measured and at each radiometric gauge;
   determining gauge-measured basis weights for each of the real standards by selecting the basis weights for corresponding transmission measurements from the surrogate-linearization for each of the radiometric gauges, thereby providing one gauged-measured basis weight for each real standard and each radiometric gauge;
   comparing the gauge-measured basis weight to lab-measured bases weights for each of the real standards; and
   assigning to all of the surrogate standards a validation value of (i) passed if a numerical comparison between the gauge-measured and lab-measured bases weight fulfils a pre-defined accuracy criterion, or (ii) failed if the numerical comparison does not fulfil the pre-defined accuracy criteria.

3. The method according to claim 2, wherein the numerical comparison is an absolute difference or a percentage difference.

4. The method according to claim 1, wherein the one or more radiometric gauges provide beta-rays, gamma-rays or x-rays.

5. The method according to claim 1, wherein the one or more radiometric gauges provide a different energy of ionizing radiation from the remaining radiometric gauges.

6. The method according to claim 1, wherein providing the linearizations for the real standards comprises:
   providing one or more of the real standards comprising a lithium ion battery (LIB) electrode material, the real standards each having a lab-measured basis weigh;
   positioning the real standards in the sampling area of one or more radiometric gauges, wherein the real standards are positioned one at time for each real standard and each radiometric gauge;
   measuring transmission of radiation through the real standards using the radiometric gauges, thereby providing a $RS^2$-transmission measurement for each real standard measured and at each radiometric gauge;
   constructing linearizations of basis weight to transmission measurement by relating the lab-measured bases weight to the $RS^2$-transmission measurement, wherein one linearization is constructed for each of the radiometric gauges.

7. The method according to claim 6, wherein the real standards are provided by cutting the real standards out of a web of the LIB electrode material to a defined or measured area, weighing the real standards to provide the mass, and calculating the lab-measured basis weight from the weight and area to provide the lab-measured basis weight.

8. The method of claim 7, wherein the web of LIB electrode comprises a cathode substrate, an anode substrate, a cathode active material, and anode active material or a combination of one or more layers of these.

9. The method according to claim 8, wherein the LIB material comprises two or more layers and, after measuring transmission of radiation through the real standards using the radiometric gauges, and prior to weighing the real standards to provide the mass, all but one of the layers is removed from the real standards, wherein the remaining layer is weighted to provide the mass.

10. A calibration sample set for radiometric gauges, the calibration sample set comprising one or more surrogate standards made according to the method of claim 1.

11. The calibration sample set according to claim 10, wherein the inert material is not degraded by ionizing radiation provided by the gauges, does not absorb water, does not react or degrade in air, and is non-toxic.

12. The calibration sample set according to claim 10, wherein the surrogate standards are each configured as a foil or sheet.

13. The calibration sample set according to claim 12, wherein the foil or sheet have a uniform thickness and a uniform density throughout.

14. The calibration sample set according to claim 12, wherein at least a first surrogate and a second surrogate standard have different thickness.

15. The calibration sample set according to claim 10, wherein assigning to each surrogate standard a surrogate basis weight comprises providing an indicia to each surrogate standard indicative of the surrogate basis weight, where the indicia is configured to not interfere with the ionizing radiation provided by radiometric gauge when the surrogate standard is positioned in the sampling area of the radiometric gauge.

16. The calibration sample set according to claim 15, wherein the surrogate standard includes a frame configured to hold the surrogate standard and the indicia is positioned on the frame.

17. The calibration sample set according to claim 10, wherein the absolute difference between $Z_{surrogate}$ and $Z_{real}$ is less than or equal to 10, $|Z_{surrogate}-Z_{real}|\leq 10$.

18. The calibration sample set according to claim 10, wherein each surrogate standard includes one of aluminum, titanium, copper, or an organic polymer.

19. A method of calibrating a radiometric gauge comprising:
- providing one or more surrogate standards made according to the method of claim 1;
- positioning the surrogate standards one at a time in a sampling area of the radiometric gauge;
- measuring transmission of radiation through the surrogate standards using the radiometric gauges, thereby providing a transmission measurement for each surrogate standard measured; and
- constructing linearization of basis weight to transmission measurement by relating the surrogate basis weight to the transmission measurements.

* * * * *